(12) United States Patent
Miller et al.

(10) Patent No.: US 7,663,662 B2
(45) Date of Patent: Feb. 16, 2010

(54) HIGH AND LOW RESOLUTION CAMERA SYSTEMS AND METHODS

(75) Inventors: John L. Miller, Lake Oswego, OR (US);
Jeff Frank, Santa Barbara, CA (US);
Andrew C. Teich, West Linn, OR (US)

(73) Assignee: FLIR Systems, Inc., Wilsonville, OR (US)

( * ) Notice: Subject to any disclaimer, the term of this patent is extended or adjusted under 35 U.S.C. 154(b) by 1025 days.

(21) Appl. No.: 11/053,991

(22) Filed: Feb. 9, 2005

(65) Prior Publication Data

US 2006/0175549 A1 Aug. 10, 2006

(51) Int. Cl.
*H04N 5/33* (2006.01)
*G02F 1/01* (2006.01)

(52) U.S. Cl. ...................................... 348/164; 250/330

(58) Field of Classification Search ................. 348/164, 348/143, 335, 588; 342/42; 250/330
See application file for complete search history.

(56) References Cited

U.S. PATENT DOCUMENTS

| | | | | | |
|---|---|---|---|---|---|
| 3,922,549 | A | * | 11/1975 | Back | 250/330 |
| 3,934,250 | A | * | 1/1976 | Martin, Jr. | 342/42 |
| 5,005,083 | A | * | 4/1991 | Grage et al. | 348/588 |
| 6,320,610 | B1 | * | 11/2001 | Van Sant et al. | 348/143 |
| 6,323,858 | B1 | | 11/2001 | Gilbert et al. | |
| 6,337,683 | B1 | | 1/2002 | Gilbert et al. | |
| 6,654,019 | B2 | | 11/2003 | Gilbert et al. | |
| 6,738,073 | B2 | | 5/2004 | Park et al. | |
| 2005/0062869 | A1 | * | 3/2005 | Zimmermann et al. | 348/335 |
| 2006/0028547 | A1 | * | 2/2006 | Chang | 348/143 |

* cited by examiner

*Primary Examiner*—Gims S Philippe
(74) *Attorney, Agent, or Firm*—Haynes and Boone, LLP

(57) ABSTRACT

Systems and methods provide high and low resolution cameras. For example, in accordance with an embodiment of the present invention, a camera system provides wide and narrow fields of view simultaneously. An operator may select different views to be provided by the camera system (e.g., a wide field of view, a narrow field of view, or the combination of the wide and narrow field of views).

21 Claims, 9 Drawing Sheets

HIGH AND LOW RESOLUTION CAMERA SYSTEMS AND METHODS

TECHNICAL FIELD

The present invention relates generally to cameras and, more particularly, to camera systems and methods, such as for example camera systems having high and low resolution cameras.

BACKGROUND

Cameras and various types of camera systems are well known and applied in a wide variety of applications to view and/or record images. A typical application, for example, of a camera system is to provide surveillance, such as for perimeter and facility security or general area awareness or monitoring of a given area. However, conventional cameras and camera systems have a number of potential drawbacks.

For example, a conventional camera or camera system for surveillance typically has a limited or narrow field of view. To overcome this limitation, for example, the camera may be mechanically driven to point at a desired area to be monitored that exceeds its limited field of view. However, this allows a portion of the required field of view to be unmonitored for a certain period of time, depending upon the slewing parameters of the mechanically driven camera.

As another example, a conventional camera may include a field of view that can be switched between a wide field of view and a narrow field of view. A user, for example, may switch to the narrow field of view to provide a higher resolution for an area of interest. However, it may be difficult to locate immediately the desired area of interest when switching to the narrow field of view (e.g., due to time delays associated with the switching), sometimes referred to as a loss of track problem. As a result, there is a need for an improved camera and camera techniques.

SUMMARY

Systems and methods are disclosed herein to provide high and low resolution cameras. For example, in accordance with an embodiment of the present invention, a camera system includes a narrow field of view camera along with a wide field of view camera. Consequently, the camera system may provide wide and narrow fields of view simultaneously for a given area on a display. An operator may select the narrow field of view to be located and displayed within the wide field of view's display area. Furthermore, multiple operators of the camera system may select different views to be provided by the camera system (e.g., a wide field of view, a narrow field of view, or the combination of the wide and narrow field of views). The camera system may further provide certain benefits relative to a conventional camera system, for example, in terms of a higher degree of reliability (e.g., due to fewer moving parts or camera redundancy).

More specifically, in accordance with one embodiment of the present invention, a camera system includes a camera housing; a first infrared camera, secured within the camera housing, adapted to provide a wide field of view; a second infrared camera, secured within the camera housing, adapted to provide a narrow field of view centered within the wide field of view of the first infrared camera; and means for moving the camera housing.

In accordance with another embodiment of the present invention, a camera system includes a first infrared camera adapted to provide a wide field of view; a second infrared camera adapted to provide a narrow field of view; and a third camera adapted to provide images for a visible spectrum region, wherein the first and second infrared camera and the third camera are secured to a camera housing and wherein the wide field of view, the narrow field of view, and the third field of view are centered at a certain distance from the camera housing.

In accordance with another embodiment of the present invention, a method of providing images for an area of interest includes providing a first thermal image data covering a narrow field of view; providing a second thermal image data covering a wide field of view, wherein the narrow field of view of the first thermal image data is centered in a first fixed area of the wide field of view of the second thermal image data; and displaying the first and second thermal image data.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
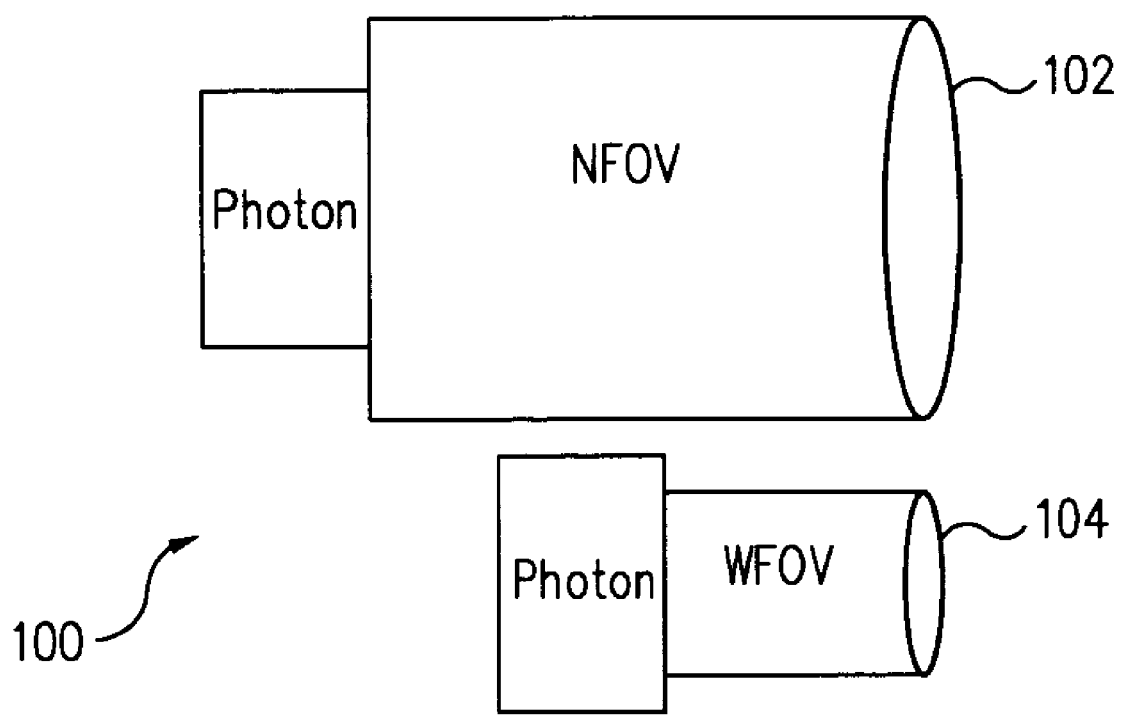
FIG. 1 shows a block diagram illustrating a camera system in accordance with an embodiment of the present invention.

FIG. 1 shows a block diagram illustrating a camera system 100 in accordance with an embodiment of the present invention. Camera system 100 includes a camera 102 (e.g., a narrow field of view (NFOV) camera) and a camera 104 (e.g., a wide field of view (WFOV) camera).

Cameras 102 and 104, for example, may be implemented as infrared cameras (cooled or uncooled), which may be incorporated into a single camera housing as part of a camera system. As a specific implementation example, cameras 102 and 104 may represent infrared cameras (e.g., Photon infrared cameras), which are available from FLIR Systems™, Inc. As described further herein, cameras 102 and 104 may form part of a camera system that provides simultaneous views of an area of interest for one or more operators of the camera system. For example, as explained further herein, cameras 102 and 104 may be employed to provide foveal vision by utilizing the different FOV optics, with the image from camera 102 (NFOV) overlaid onto the image from camera 104 (WFOV).

Figure 2:
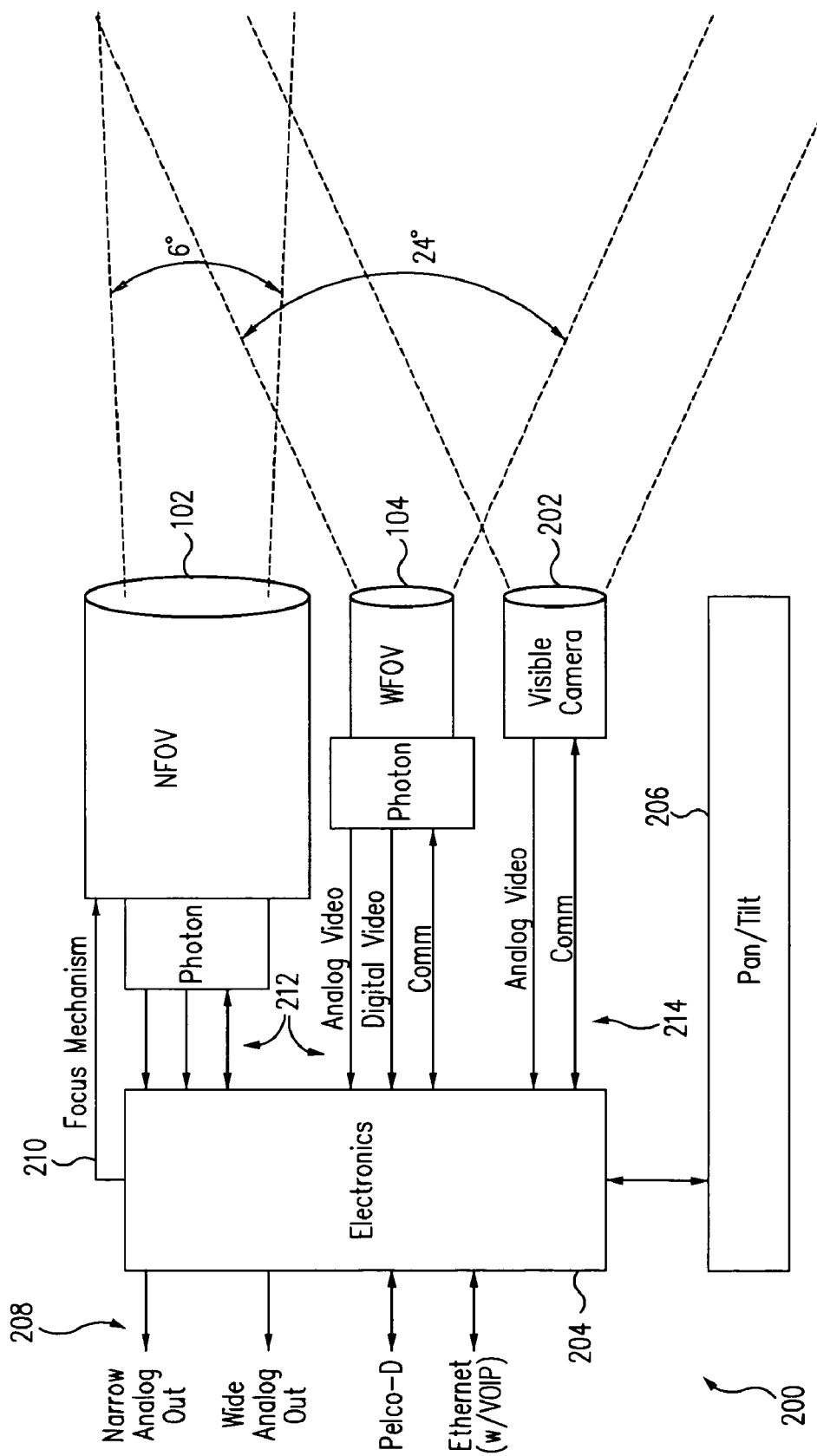
FIG. 2 shows a block diagram illustrating a camera system in accordance with an embodiment of the present invention.

As an example, FIG. 2 shows a block diagram illustrating a camera system 200 in accordance with an embodiment of the present invention. Camera system 200 includes cameras 102 and 104, a camera 202, system electronics 204, and a directional control 206. Camera system 200 may be incorporated into a camera housing to form a camera unit for mounting or positioning to provide views of a desired area.

Cameras 102 and 104 may represent infrared cameras, while camera 202 may represent an optional camera for providing images in the visible electromagnetic spectrum. For example, camera 102 may provide a NFOV (e.g., approximately 6 degrees), camera 104 may provide a WFOV (e.g., approximately 24 degrees), and camera 202 may provide a FOV based on a normal lens (e.g., 50 mm focal length), a wide angle lens (e.g., 18 mm focal length), a telephoto lens (e.g., 200 mm focal length) or a vari-focal or zoom lens.

Cameras 102, 104, and 202 may be aligned so that their field of views overlap or are centered (e.g., boresight) at approximately the same area for a given distance. Directional control 206 (e.g., a pan/tilt directional control) allows a user to control the focal direction or orientation of camera system 200. For example, directional control 206 allows a user to manually direct or point camera system 200 in a direction of interest for the user by the user issuing commands to camera system 200. Directional control 206 may also be automated to scan repeatedly or randomly over an area of interest. Furthermore, directional control 206 may also optionally be implemented to control cameras 102, 104, and 202 individually so that each may be independently controlled and pointed in a desired direction.

System electronics 204, for example, receives or provides various interface signals 208, 210, 212, and 214 for camera system 200. Interface signals 208 may represent or include various control signals (e.g., Pelco-D protocol control signals) to and from camera system 200 and data signals, such as for example data from camera 102 (e.g., narrow analog out data), camera 104 (e.g., wide analog out data), and camera 202. Interface signals 208 may be communicated via a wireless or a wired interface (e.g., Ethernet connection).

System electronics 204 may control directional control 206 as well as cameras 102, 104, and 202. For example, system electronics 204 may control the focus of camera 102 (e.g., via a focus mechanism control signal 210). System electronics 204 generally receives data signals (e.g., analog and/or digital video) from cameras 102, 104, and 202 and transfers communication (comm) signals to and from cameras 102, 104, and 202 via interface signals 212 and 214.

Figure 3:
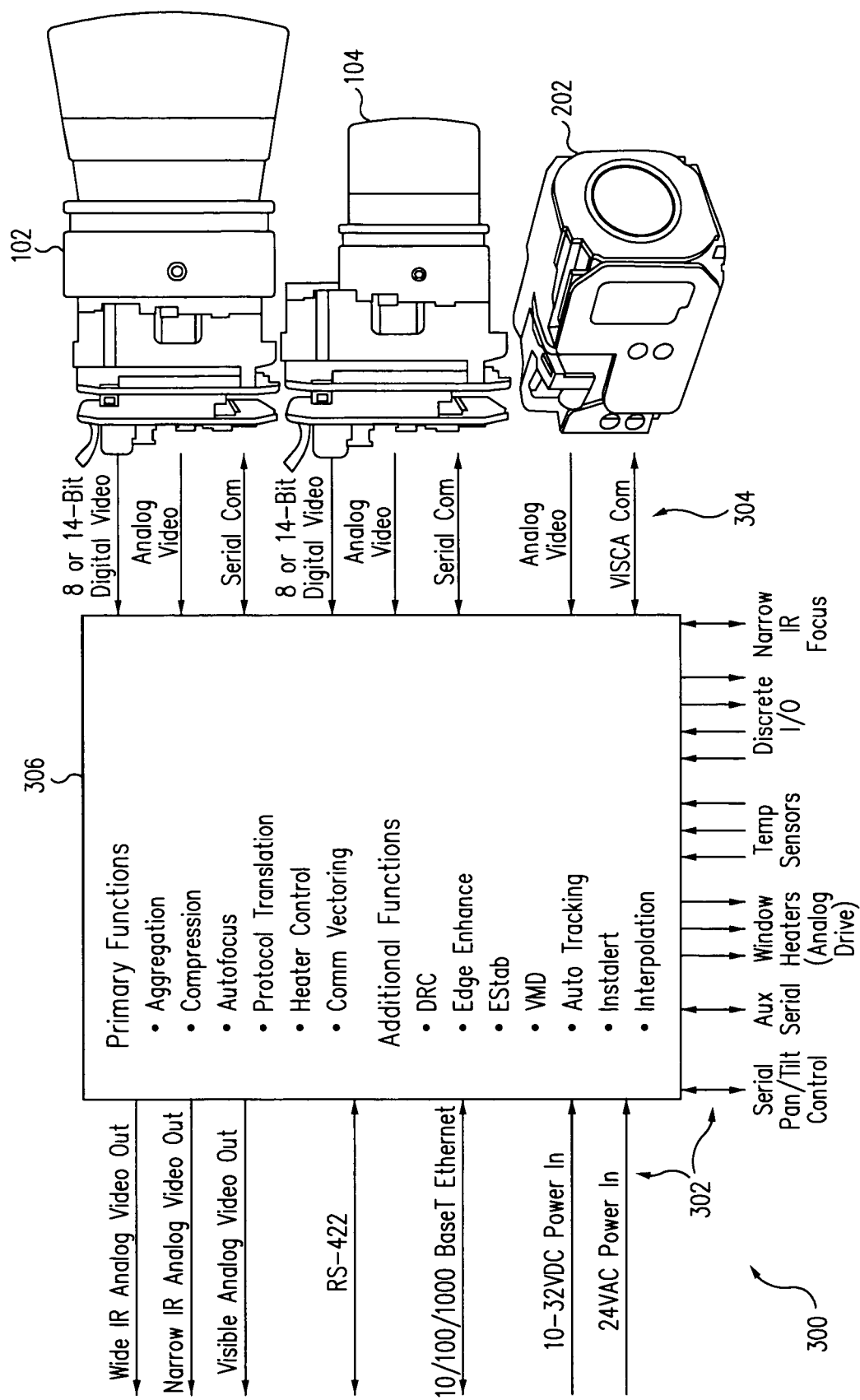
FIG. 3 shows a block diagram illustrating a camera system in accordance with an embodiment of the present invention.

FIG. 3 shows a block diagram illustrating a camera system 300 in accordance with an embodiment of the present invention. Camera system 300 may represent a more specific functional implementation of camera system 200 and highlight various exemplary functions or input/output signal flow (e.g., an exemplary system block diagram). A functional block 306 may represent functions for system electronics 204 or camera system functions performed, for example, by camera system 200 and an external device (e.g., a computer or other type of processing device adapted to utilize the data provided by camera system 200).

Cameras 102, 104, and 202 via interface signals 304 transfer control signals (e.g., serial communication (com) or VISCA protocol communication (com)) and data (e.g., 8 or 14 bit digital video and/or analog video) to and/or from functional block 306. Furthermore, interface signals 302 provide various interfaces for camera system 300, such as for example, power (e.g., 10-32 VDC Power or 24 VAC), serial pan/tilt control, data out (e.g., wide infrared (IR) analog video out, narrow IR analog video out, and/or visible analog video out), along with input/output (I/O) signals (e.g., auxiliary serial or discrete I/O) for signals such as window heaters, temperature sensors, and focusing (e.g., for camera 202 or narrow IR focus for camera 102). Interface signals 302 may be provided over various types of wired (e.g., RS-422 or Ethernet) or wireless (e.g., 802.11g) interfaces.

For example, Table 1 provides exemplary camera parameters and bandwidth estimates for camera system 300. Furthermore, Table 1 illustrates the number of camera systems 300 that may be supported on a 10T, 100T, and 1000T Ethernet network.

TABLE 1

|  | Overall Maximum | 8-Bit IR, Uncompressed | Lossless Compression | Lossy-Compression |
|---|---|---|---|---|
| Narrow IR Camera |  |  |  |  |
| Horzontal | 320 | 320 | 320 | 320 |
| Vertical | 256 | 256 | 256 | 256 |
| Frame Rate | 30 | 30 | 30 | 30 |
| Bits/Pixel | 14 | 8 | 8 | 8 |
| Compression Ratio | 1 | 1 | 5 | 50 |
| Bit Rate | 34,406,400 | 19,660,800 | 3,932,160 | 393,216 |
| Wide IR Camera |  |  |  |  |
| Horzontal | 320 | 320 | 320 | 320 |
| Vertical | 256 | 256 | 256 | 256 |
| Frame Rate | 30 | 30 | 30 | 30 |
| Bits/Pixel | 14 | 8 | 8 | 8 |
| Compression Ratio | 1 | 1 | 5 | 50 |
| Bit Rate | 34,406,400 | 19,660,800 | 3,932,160 | 393,216 |
| Visible IR Camera |  |  |  |  |
| Horzontal | 640 | 640 | 640 | 640 |
| Vertical | 512 | 512 | 512 | 512 |
| Frame Rate | 30 | 30 | 30 | 30 |

TABLE 1-continued

|  | Overall Maximum | 8-Bit IR, Uncompressed | Lossless Compression | Lossy-Compression |
|---|---|---|---|---|
| Bits/Pixel | 8 | 8 | 8 | 8 |
| Compression Ratio | 1 | 1 | 5 | 50 |
| Bit Rate | 78,643,200 | 78,643,200 | 15,728,640 | 1,572,864 |
| Network Efficiency | 75% | 75% | 75% | 75% |
| Total Bit Rate | 196,608,000 | 157,286,400 | 31,457,280 | 3,145,728 |
| Cameras on 10T | 0 | 0 | 0 | 3 |
| Cameras on 100T | 1 | 1 | 3 | 32 |
| Cameras on 1000T | 5 | 6 | 32 | 318 |

Camera system 300 may provide or in conjunction with an external device provide various functions, such as for example aggregation and/or compression of the data, auto focus, protocol translation, heater control, and communication vectoring. Camera system 300 may further provide, for example, dynamic range compression (DRC), edge enhancement, electronic image stabilization (EStab), video motion detection (VMD), auto tracking, image object tagging (e.g., Instalert™ available from FLIR Systems™, Inc.), and interpolation. Furthermore, various features for cameras 102, 104, and/or 202 may be provided, such as for example non-uniform correction (NUC), automatic gain control (AGC), temporal filtering, and analog video generation.

Figures 4A, 4B, 4C:
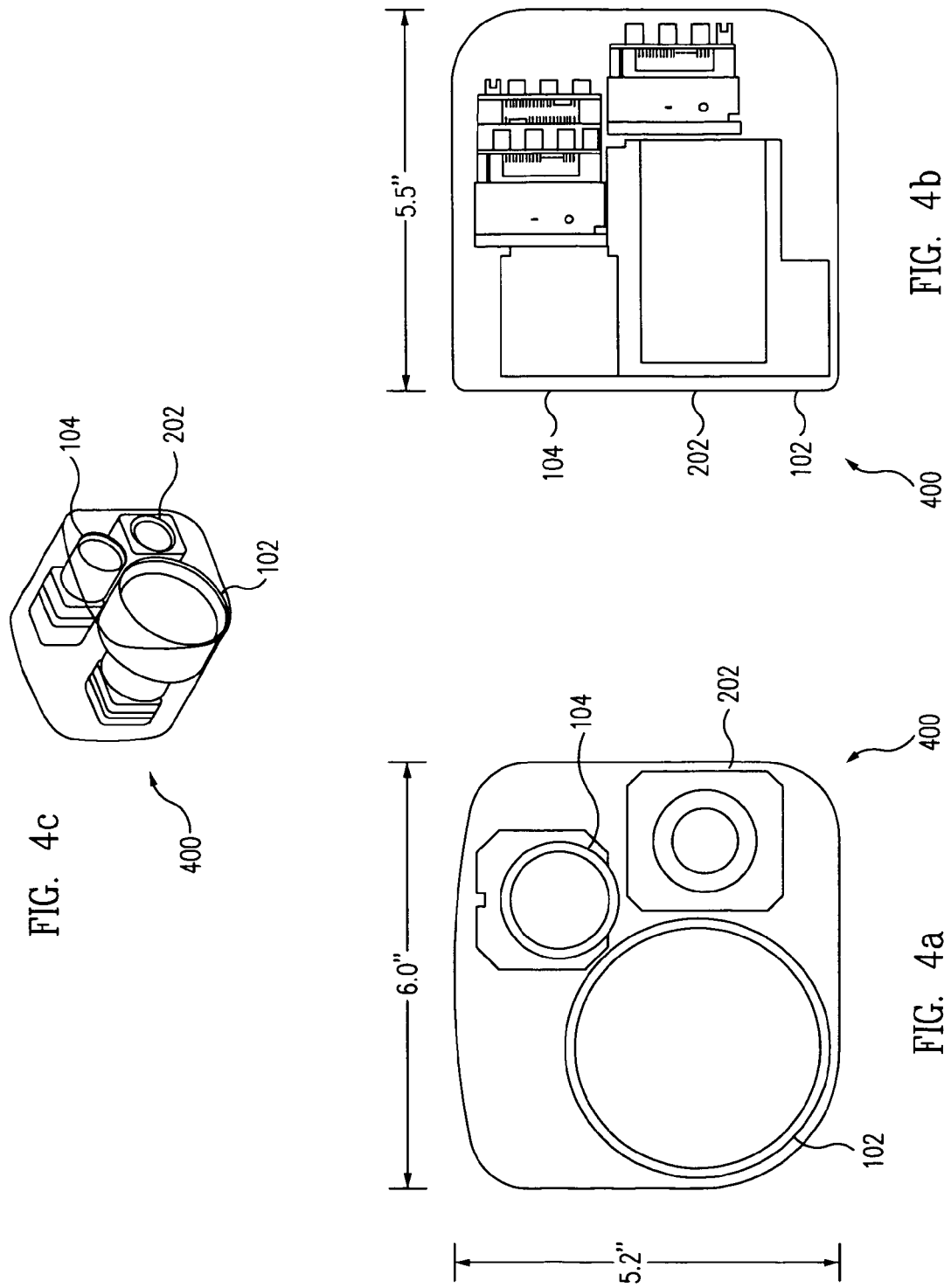
FIGS. 4a, 4b, and 4c show front, side, and perspective views, respectively, which illustrate a camera system in accordance with an embodiment of the present invention.

FIGS. 4a, 4b, and 4c show front, side, and perspective views, respectively, which illustrate a camera system 400 in accordance with an embodiment of the present invention. Camera system 400 represents a single camera housing that incorporates cameras 102, 104, and 202 and provides one or more of the features or functions discussed in reference to camera system 200 (FIG. 2) and/or camera system 300 (FIG. 3). Camera system 400 provides an enclosed unit (e.g., with exemplary dimensions of 6 by 5.5 by 5.2 inches) that may be mounted as desired to provide IR and visible views of an area.

Figure 5:
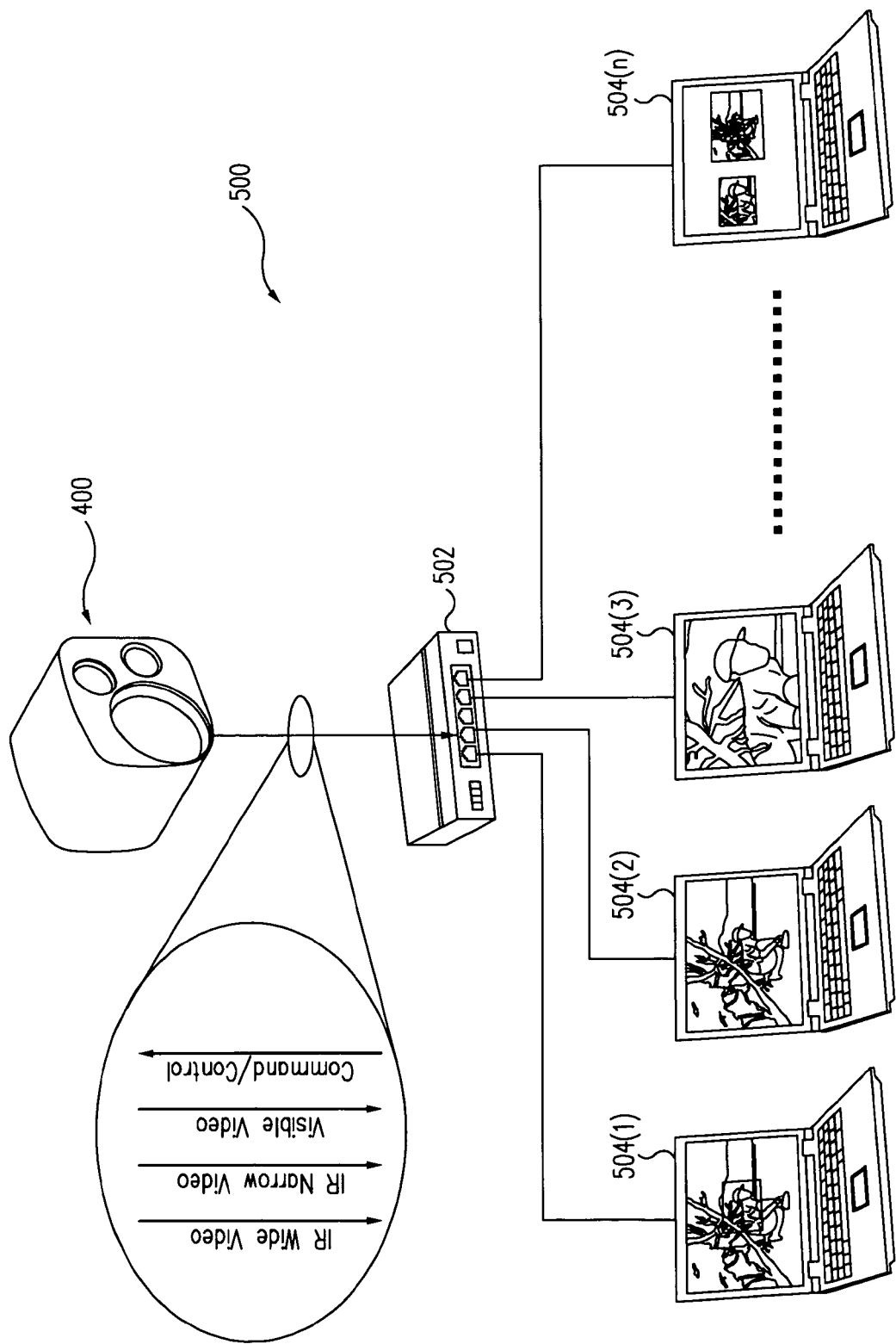
FIG. 5 shows a block diagram illustrating a camera system in accordance with an embodiment of the present invention.

Camera system 400 may be incorporated into a system that includes one or more of camera systems 400. For example, FIG. 5 shows a block diagram illustrating a camera system 500 in accordance with an embodiment of the present invention. Camera system 500 includes camera system 400 and one or more devices 504 (which are separately referenced as devices 504(1) through 504(n), where n represents the number of devices 504).

Each device 504 may represent, for example, a computer for receiving data from camera system 400 and displaying the data on a display of device 504. Device 504 may also provide control signals (commands) to camera system 400 to control, for example, the pointing or slewing (e.g., pan, tilt, or zoom) of camera system 400 or the focusing of one or more of the cameras (e.g., cameras 102 or 202). Device 504 and camera system 400 may transfer this information wirelessly or through a wired connection, such as for example via an Ethernet connection.

A router 502 (or other conventional device, e.g., a hub or a switch) may be utilized to distribute information from one or more camera systems 400 to more than one device 504 and/or each device 504 may communicate directly with camera system(s) 400. Devices 504(1) through 504(n) may then selectively view data from each camera system 400 under control of a user of the particular device 504.

For example assuming one camera system 400 within camera system 500, device 504(2) may display data from camera 104 or camera 202, while device 504(3) may display data from camera 102 (e.g., a narrow, magnified view of the image displayed on device 504(2)). Meanwhile for example, device 504(n) may show in separate portions of its display the data from camera 102, camera 104, and/or camera 202 (e.g., multiple views), while device 504(1) may display data from camera 104 along with the data from camera 102 (e.g., an inset or image overlay, referred to herein as foveal approach, foveal vision, or foveal display as discussed herein).

Figure 6:
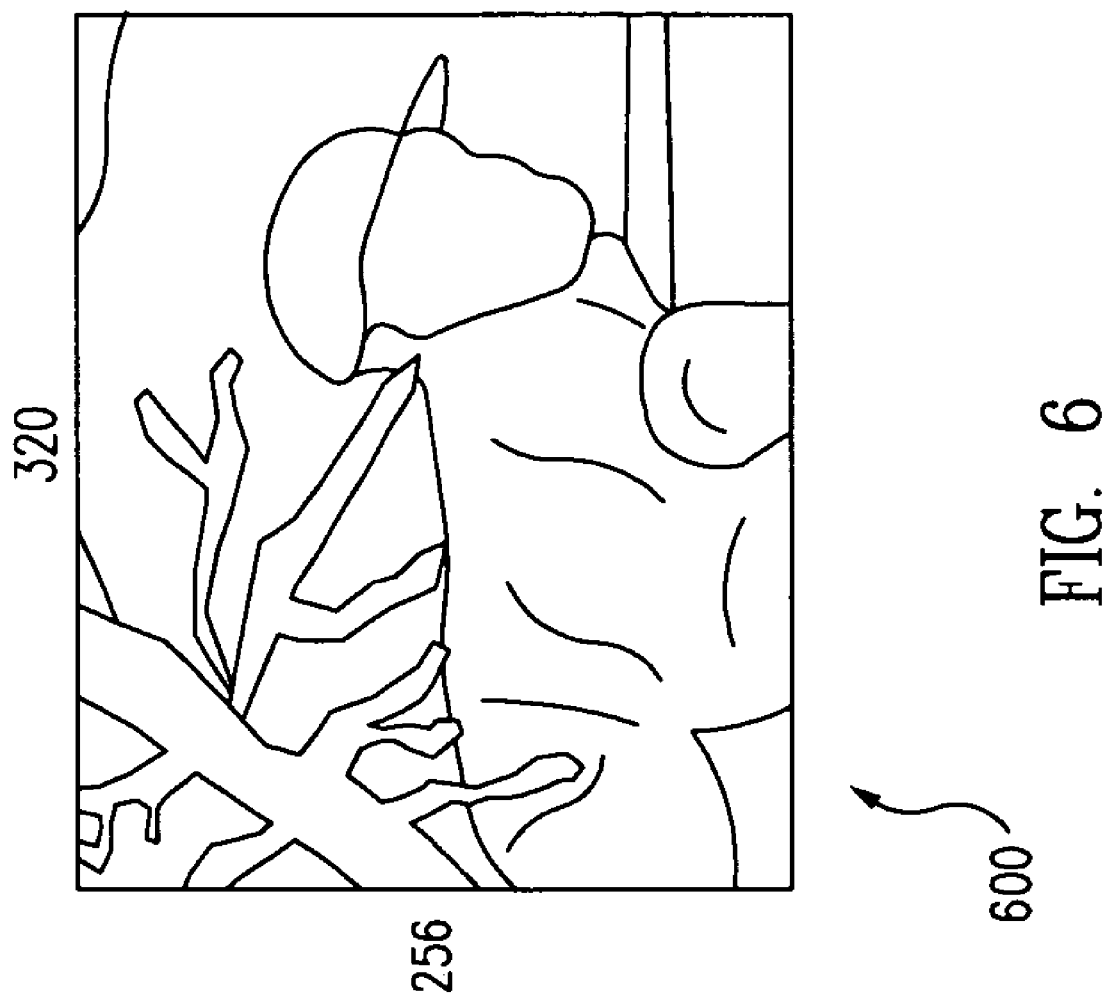
FIG. 6 shows an exemplary view provided by one camera within a camera system in accordance with an embodiment of the present invention.
Figure 7:
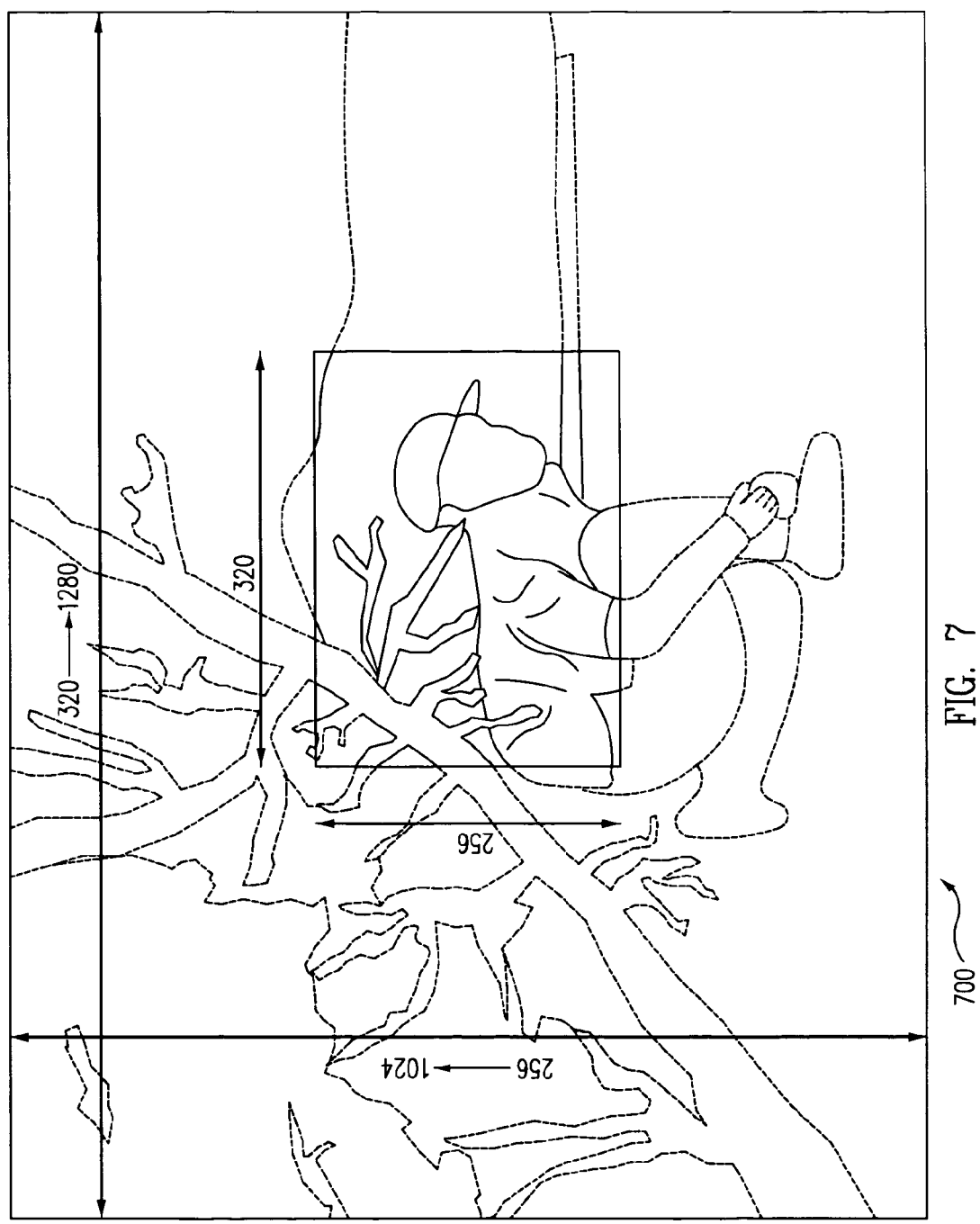
FIG. 7 shows an exemplary view provided by two cameras within a camera system in accordance with an embodiment of the present invention.

As an example, FIG. 6 shows an exemplary view provided by camera 102 of camera system 400 in accordance with an embodiment of the present invention. For this exemplary implementation, camera 102 has a 320 by 256 IR detector (e.g., a focal plane array). The image shown in FIG. 6 and provided by camera 102, for example, may be displayed within the image area provided by camera 104 as illustrated in FIG. 7 in accordance with an embodiment of the present invention. In this example, camera 104 may have an IR detector that may have a format from a 320 by 256 format to a 1280 by 1024 format.

As illustrated in FIG. 7, the image provided by camera 102 is inserted onto the image provided by camera 104 so that the device (e.g., device 504(1) of FIG. 5) can display the image provided by camera 102 centered within the image provided by camera 104 (i.e., foveal display). The two images on the display may provide certain advantages, such as for example in terms of local area contrast enhancement or automatic gain control (AGC) performed independently or uniformly for the two images. For example, the image provided by camera 102 may have one AGC setting or zone, while the image provided by camera 104 would have another AGC setting or zone, or both images may have the same AGC setting or zone applied.

An operator may shift images being displayed from camera 102 and camera 104. For example, an operator may shift images relative to one another in the display, such as by providing manual offsets in X and Y screen coordinates. The images being displayed may also be automated to provide image orientation and real-time correlation and dynamic offsets.

Figure 8:
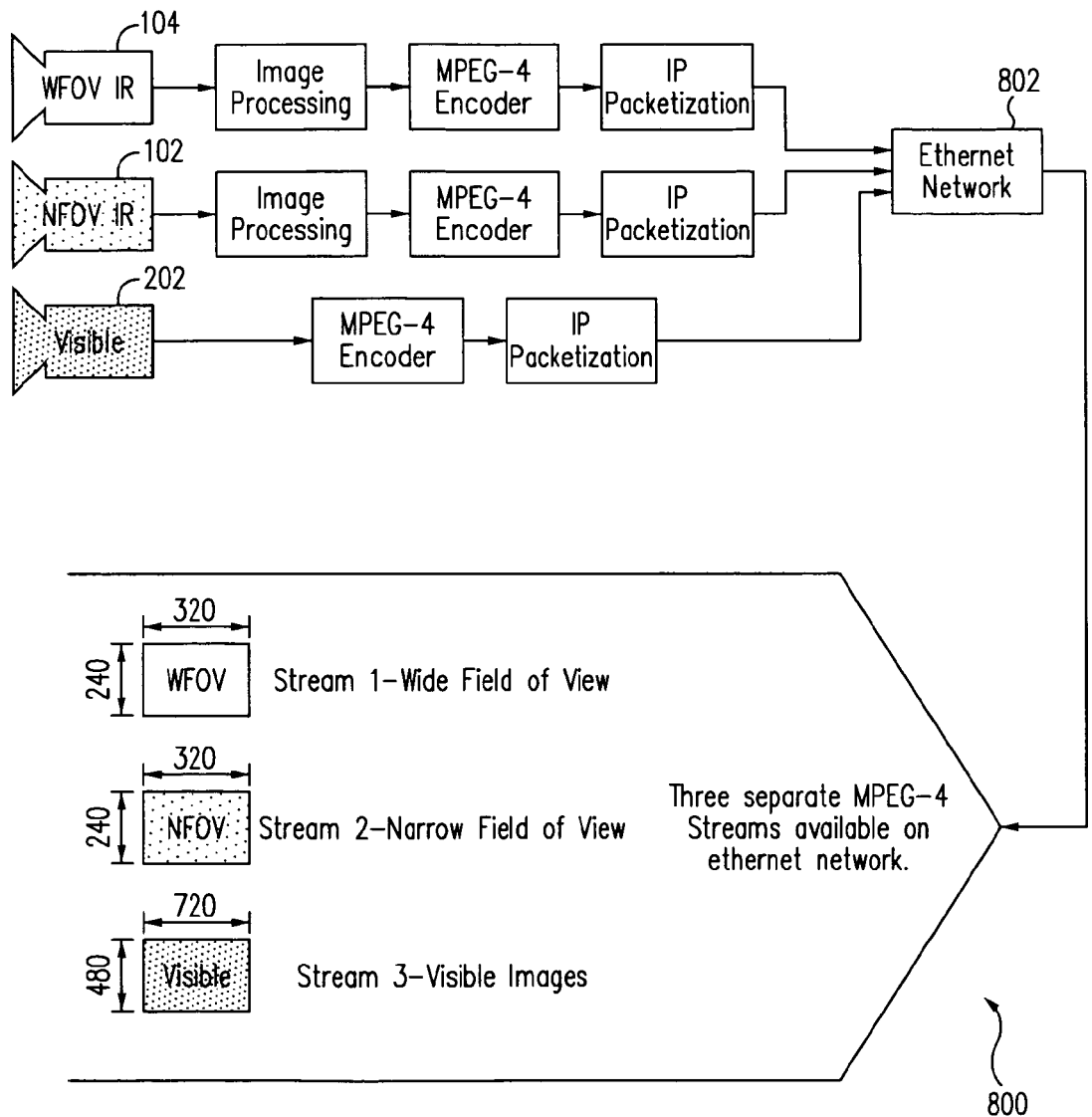
FIG. 8 shows a block diagram illustrating a camera system in accordance with an embodiment of the present invention.

As discussed herein, the data provided by cameras 102, 104, and 202 may be provided via a wired or a wireless interface. For example, FIG. 8 shows a block diagram illustrating a camera system 800 in accordance with an embodiment of the present invention. Camera system 800 may represent an exemplary implementation of camera system 200, 300, or 400 and include cameras 102, 104, and 202.

Camera system 800 illustrates a technique, in accordance with an embodiment of the present invention, of providing a separate data stream from cameras 102, 104, and 202. The data from cameras 102 and 104 may be processed (e.g., image processing block), encoded (e.g., MPEG-4 encoding or other type of encoding), and formatted (e.g., IP packetization), while the data from camera 202 may be encoded (e.g., MPEG-4 encoding) and formatted (e.g., IP packetization) to provide three separate data streams. The separate data streams may be combined in or utilized by a computer or other type of processing device (e.g., device 504 of FIG. 5).

For this exemplary implementation, three separate MPEG-4 data streams may be provided via an Ethernet network 802 from cameras 102, 104, and 202 to an external device. The processing, encoding, and formatting may be performed, for example, within the camera housing (e.g., housing of camera system 400). The field of views, shown in FIG. 8, illustrates exemplary dimensions provided by cameras 102, 104, and 202.

Figure 9:
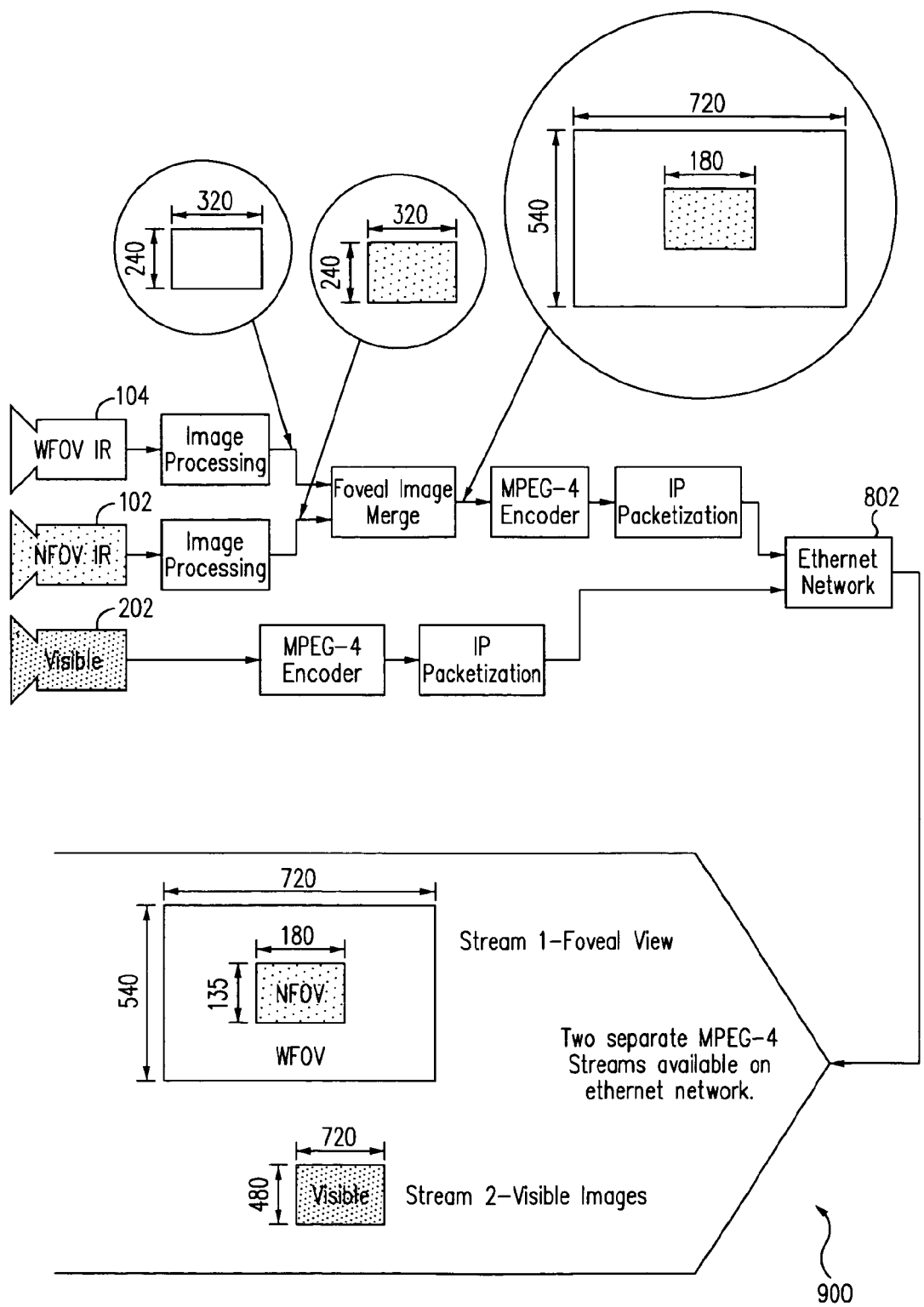
FIG. 9 shows a block diagram illustrating a camera system in accordance with an embodiment of the present invention.

As another example, FIG. 9 shows a block diagram illustrating a camera system 900 in accordance with an embodiment of the present invention. Camera system 900 is similar to camera system 800, but provides only two data streams by merging the data from cameras 102 and 104. For example, prior to encoding (e.g., MPEG-4 encoding), the data images from cameras 102 and 104 are merged into a foveal image as illustrated in FIG. 9. The foveal image merge may be performed by image processing or as a separate operation after completion of the image processing. For example, a processor may perform the processing, merging (if desired), encoding, and formatting of the data within the camera housing. Consequently, as illustrated, one data stream provided includes the foveal view (e.g., foveal thermal infrared (IR) data) from cameras 102 and 104, while another data stream includes the data from camera 202 (e.g., visible spectrum data).

As an example, Table 2 provides exemplary fields of view for cameras 102 and 104 for the exemplary implementation described in reference to FIG. 9. For this example, the foveal view composite image may be scaled into one MPEG-4 stream, with Table 2 providing exemplary horizontal and vertical dimensions (in pixels) along with scale factors. In general, camera system 800 may provide full resolution for cameras 102, 104, and 202 via separate data streams, while camera system 900 may provide, for example, a reduced resolution mode with a merged foveal output from cameras 102 and 104.

TABLE 2

| FOV | Horizontal | Vertical |
|---|---|---|
| Original WFOV | 320 | 240 |
| Composite WFOV | 1280 | 960 |
| Final WFOV | 720 | 540 |
| Original NFOV | 320 | 240 |
| Composite NFOV | 320 | 240 |
| Final NFOV | 180 | 135 |
| WFOV Scale Factor | 2.25 | 2.25 |
| NFOV Scale Factor | 0.5625 | 0.5625 |

In general, in accordance with an embodiment of the present invention, camera systems are disclosed that incorporate two or more cameras, with at least one camera having a narrow field of view and at least one camera having a wide field of view. The camera system may provide certain advantages over conventional camera systems (e.g., a camera having a dual or switchable field of view).

For example, by providing multiple camera cores and corresponding optics, improved performance and flexibility may be achieved, such as for example offering dual aperture systems and dual image capability, while increasing reliability and redundancy (e.g., for high reliability or mission critical applications). Reliability may be increased due to fewer/simpler mechanical systems or fewer moving parts. For example, a field of view change mechanism for a camera is not required and a focus mechanism may be applicable for only the narrow field of view camera. The power surge requirements may also be reduced due to the field of view change mechanism being eliminated. Furthermore, redundancy improves reliability. For example, if one camera fails, the other camera will still operate and, therefore, the probability of total camera system loss decreases (e.g., total image loss probability is reduced due to multiple camera apertures).

The camera system, in accordance with an embodiment of the present invention, may offer wide and narrow fields of view simultaneously to provide situational awareness (e.g., with the wide field of view) and long detection or recognition ranges (e.g., with the narrow field of view) simultaneously. Multiple operators may have simultaneous access to different views from the camera system having the wide and narrow field of view cameras.

Furthermore, there may be zero or minimal latency when switching between fields of view. For example, this benefit may reduce or eliminate loss of track problems that may generally occur with single camera systems when an operator or an auto tracker program must wait during the transition (e.g., two seconds) from one field of view to another. In addition, auto tracker programs can continue to track in the wide field of view, while an operator switches to the narrow field of view for a closer inspection, with no loss of track because the wide field of view image is maintained. If the auto tracker program switches to the narrow field of view, the probability of a loss of track is greatly diminished because there is little or no delay in viewing the selected field of view. Therefore, instantaneous field of view switching and foveal viewing modes may reduce or eliminate problems associated with conventional cameras.

The camera system, in accordance with an embodiment of the present invention, may enable certain image processing features, such as for example the foveal display or foveal camera system approach, stereo vision or stereo enhancement, image enhancement, and/or improved resolution. The optics for the cameras within the camera system may be simpler and offer better optical performance at a reduced cost. The optics may provide better transmission, possibly lower f-stop values (i.e., wider apertures), improved non-uniformity correction between field of views, and less sensitivity to off-axis radiation, which may reduce the need for through-the-lens flat fields.

Embodiments described above illustrate but do not limit the invention. It should also be understood that numerous modifications and variations are possible in accordance with the principles of the present invention. Accordingly, the scope of the invention is defined only by the following claims.

We claim:

1. A camera system comprising:
  a camera housing;
  a first infrared camera, secured within the camera housing, adapted to provide a wide field of view;
  a second infrared camera, secured within the camera housing, adapted to provide a narrow field of view centered within the wide field of view of the first infrared camera;
  a third camera, secured within the camera housing, adapted to provide images covering a visible portion of an electromagnetic spectrum, wherein the third camera provides a field of view centered and fixed within the wide field of view of the first infrared camera and within the narrow field of view of the second infrared camera;
  an interface circuit, secured within the camera housing, adapted to receive image data from the first infrared camera, the second infrared camera, and the third camera and provide the image data as network data streams to a network;

wherein the camera housing encloses the first and second infrared cameras, the third camera, and the interface circuit and forms a first camera system, and wherein a processor coupled to the network is able to receive the network data streams from one or more of the first camera systems to select from among the network data streams to store and/or display the corresponding image data; and means for moving the camera housing.

2. The camera system of claim 1, wherein the network data streams provide a first network data stream corresponding to the image data from the third camera and at least a second network data stream corresponding to the image data from the first and second infrared cameras.

3. The camera system of claim 2, wherein the third camera has a wide angle lens, a normal lens, a telephoto lens, a vari-focal lens, or a zoom lens, and wherein at least one of the second network data streams corresponds to a foveal view composite image which has been scaled and encoded.

4. The camera system of claim 3, wherein the first and second infrared cameras and the third camera are directed to provide field of views that are centered at a certain distance from the camera housing, and wherein the foveal view composite image provides a composite and scaled version of the image data from the first and second infrared cameras, with different scale factors for the image data from the first and second infrared cameras.

5. The camera system of claim 1, wherein the moving means is adapted to pan and tilt the camera housing.

6. The camera system of claim 2, further comprising:
a device having the processor and a display, wherein the device is adapted to show on the display the image data provided by the first infrared camera, the second infrared camera, and the third camera based on the selected network data streams.

7. The camera system of claim 6, wherein the interface circuit is adapted to provide image processing, image merging, encoding, and a formatting of the image data.

8. The camera system of claim 6, wherein the device is adapted to show on the display the image data from the first infrared camera and the second infrared camera as a foveal image.

9. The camera system of claim 6, wherein the interface circuit is adapted to provide a wireless interface.

10. A camera system comprising:
a first infrared camera adapted to provide a wide field of view;
a second infrared camera adapted to provide a narrow field of view;
a camera housing;
a third camera adapted to provide images for a third field of view of a visible spectrum region, wherein the first and second infrared cameras and the third camera are secured within the camera housing and wherein the wide field of view, the narrow field of view, and the third field of view are centered and set at a certain distance from the camera housing; and
an interface circuit, secured within the camera housing, adapted to receive image data from the first infrared camera, the second infrared camera, and the third camera and provide the image data as network data streams to a network, with at least one of the network data streams providing a foveal view composite image which has been scaled and encoded with different scale factors;
wherein the network data streams are provided from the interface circuit to the network such that a computer coupled to the network is able to receive the network data streams to select from among the network data streams, from one or more of the camera systems providing the network data streams to the network, to store and/or display the corresponding image data.

11. The camera system of claim 10, further comprising means for providing at least one of a pan and a tilt for the camera housing.

12. The camera system of claim 10, further comprising a plurality of the computers coupled to the network to select the network data streams provided by the camera systems coupled to the network.

13. The camera system of claim 12, wherein the computers are adapted to display the image data as a foveal image along with the image data of the visible spectrum region.

14. The camera system of claim 12, wherein an automatic gain control is applied uniformly to the image data from the first and second infrared cameras.

15. The camera system of claim 12, wherein the network data streams correspond to the image data from the first infrared camera, the second infrared camera, the third camera, and the foveal view composite image.

16. The camera system of claim 12, wherein the interface circuit is adapted to provide image processing, image merging, encoding, and formatting of the image data.

17. A method of providing images for an area of interest, the method comprising:
generating first thermal image data, from within a first camera housing, covering a narrow field of view;
generating second thermal image data, from within the first camera housing, covering a wide field of view, wherein the narrow field of view of the first thermal image data is centered in a first fixed area of the wide field of view of the second thermal image data;
generating first visible image data having a first field of view from within the first camera housing, wherein the first field of view of the first visible image data is centered in the first fixed area of the wide field of view of the second thermal image data;
providing the first visible image data, the first thermal image data, and the second thermal image data from the first camera housing as network data streams to a network, with at least one of the network data streams providing a foveal view composite image which has been scaled and encoded with different scale factors; and
wherein the network data streams are provided to the network such that a computer coupled to the network is able to receive the network data streams to select from among the network data streams to store and/or display the corresponding image data.

18. The method of claim 17, further comprising selecting by each of the computers coupled to the network from the network data streams provided on the network from the first camera housings.

19. The method of claim 17, wherein the network data streams correspond to the first thermal image data, the second thermal image data, the first visible image data, and the foveal view composite image.

20. The method of claim 17, wherein the providing comprises image processing, image merging, encoding, and formatting for at least the first and second thermal image data.

21. The method of claim 17, further comprising slewing the first camera housing over an area of interest.

* * * * *